Patented June 24, 1952

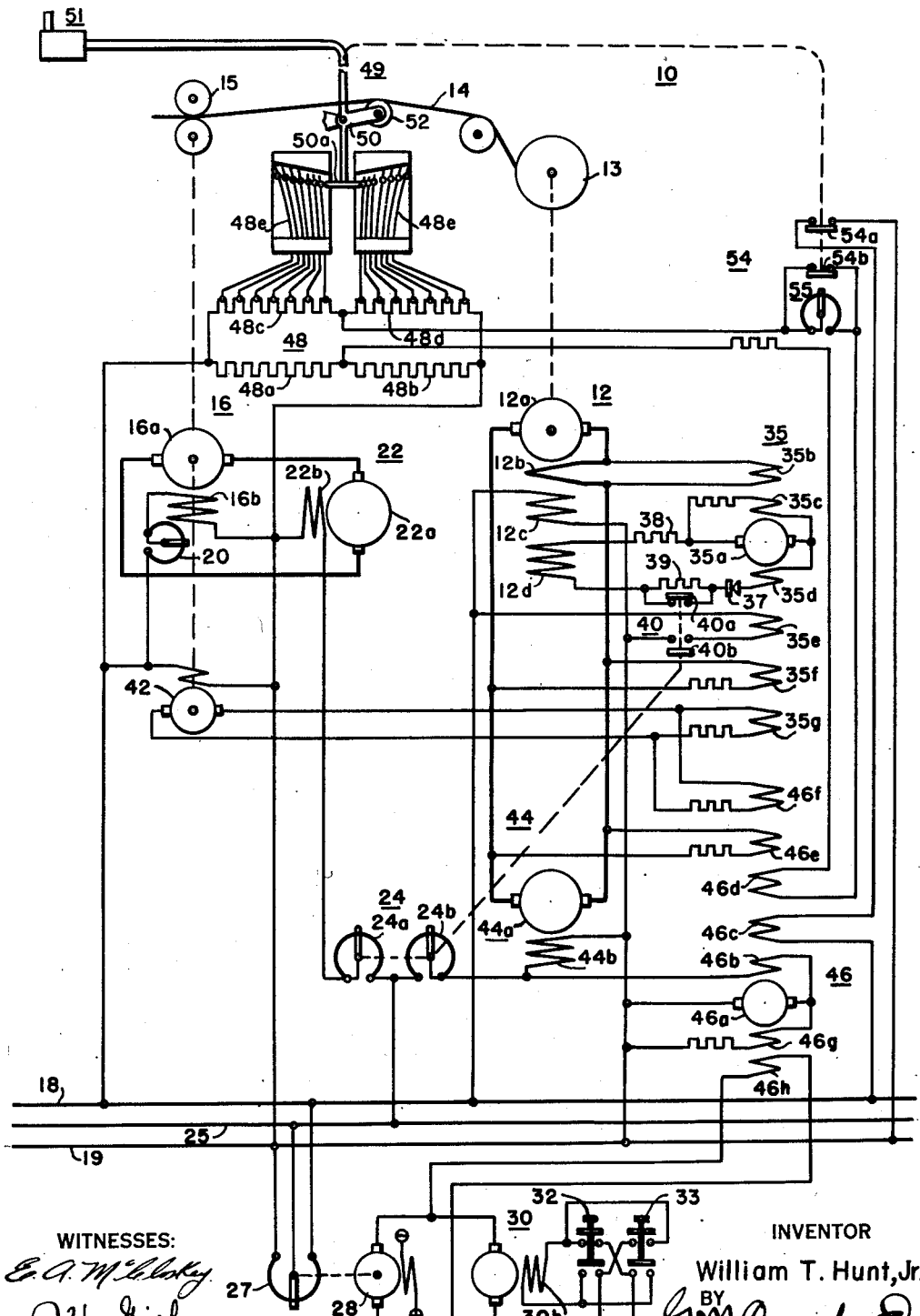

2,601,527

UNITED STATES PATENT OFFICE 2,601,527

TENSION CONTROL SYSTEM

William T. Hunt, Jr., Williamsville, N. Y., assignor to Westinghouse Electric Corporation, East Pittsburgh, Pa., a corporation of Pennsylvania Application August 12, 1949, Serial No. 110,011

10 Claims. (Cl. 318—6)

My invention relates generally to tension control systems, and it has reference in particular to control systems for reel motors and the like utilizing tensiometer devices responsive to the tension of a strip of material.

Generally stated it is an object of my invention to provide a tension control system that is simple and inexpensive to manufacture, and is efficient and reliable in operation.

More specifically it is an object of my invention to provide, in a control system for a reel motor, for using a tensiometer device for controlling the operation of the reel motor by means of a generator of the regulating type.

Another object of my invention is to provide, in a control system for a reel motor, for utilizing a regulating generator for controlling the voltage applied to the reel motor in accordance with the operating position of a tensiometer device responsive to the tension of a strip of material being wound on a reel, and for modifying the control of the regulating generator in accordance with the transient variations in the voltage applied to the reel motor.

Yet another object of my invention is to provide, in a control system for a reel motor, for varying the basic energization of the reel motor generator field winding in accordance with the speed of a mill or other work device supplying a strip of material to the reel device, and for utilizing a tensiometer device actuated by the strip for varying the excitation from this base value.

It is an important object of my invention to provide, in a tension control system, for varying the output voltage of a tension control regulating generator in accordance with tension of a strip of material being wound on a reel device and for stabilizing the operation of the regulating generator by utilizing a differential field winding on the regulating generator which is energized in accordance with variations in the voltage supplied to the reel motor.

Another important object of my invention is to provide, in a control system for a reel motor connected in driving relation with a reel device, for regulating the field excitation of the reel motor so as to match the counter E. M. F. of the reel motor with the speed of the mill, and for regulating the energization of the armature in response to operation of a tensiometer device actuated by a strip of material being wound on the reel device.

A further object of my invention is to provide, in a control system for a reel motor connected in driving relation with a reel device for handling a strip of material, for regulating the tension of the strip by utilizing a regulating generator to vary the voltage applied to the armature of the reel motor in accordance with the operating position of a tensiometer device actuated by the strip, and for stabilizing operation of the reel motor by modifying the output voltage of the regulating generator in accordance with a differential between the voltage applied to the armature of the reel motor and a voltage which is substantially proportional to the speed of the strip of material.

Other objects will in part be obvious, and will in part be explained hereinafter.

In practicing my invention in one of its forms, the field excitation of a reel motor connected in driving relation with a reel device for winding a strip of material proceeding from a mill stand or other work device is provided by a regulating generator which maintains a predetermined relation between the counter E. M. F. of the reel motor and the output voltage of a pilot generator driven by the mill stand. The voltage applied to the armature of the reel motor is provided basically by excitation of the field winding of the reel motor generator from a source of reference voltage which is utilized to determine the speed of the mill stand. Regulation of the voltage applied to the reel motor armature is provided by a regulating generator connected in shunt relation with the generator field winding and the source of reference voltage, and whose output voltage is basically responsive to the operating position of a tensiometer device actuated by the strip. The output voltage of the regulating generator is stabilized by utilizing a cumulative pilot field winding energized by the pilot generator and a differential voltage field winding which is energized in accordance with the armature voltage of the reel motor. A limit switch on the tensiometer device cuts in a control resistor in the operating circuit of the tensiometer device to limit the speed of the reel motor to a value slightly higher than the mill speed in the minimum tension position of the tensiometer device.

For a more complete understanding of the nature and scope of my invention reference may be made to the following detailed description, which may be read in connection with the accompanying drawing in which the single figure is a diagrammatic view of a tension control system embodying the invention in one of its forms.

Referring to the drawing, the reference numeral 10 may denote generally a tension control system for controlling the operation of a reel motor 12 which may be connected in driving relation with a reel device 13 for winding a strip of material 14 proceeding from between the rolls 15 of the last stand of a strip mill or the like.

The rolls 15 may be connected in driving relation with a mill motor 16 having an armature 16a and a field winding 16b. The field winding 16b may be connected to a suitable source of substantially constant voltage represented by the conductors 18 and 19 by means of a field rheostat 20.

The armature 16a may be supplied with electrical energy from a mill generator 22 having an armature 22a and a field winding 22b. The field winding 22b may be connected through section 24a of a master rheostat 24 to a variable voltage source of reference voltage represented by the conductors 18 and 25.

This variable voltage may be provided in any suitable manner being, for example, derived from the conductors 18 and 19 and by means of a rheostat or potentiometer device 27 which may be actuated by means of a rheostat motor 28. Operation of the rheostat motor 28 may be controlled by means of a rheostat motor generator 30 having a field winding 30b which may be selectively connected to a source of control voltage in opposite senses by means of "raise" and "lower" push button switches 32 and 33 respectively.

The reel motor 12 may comprise an armature 12a having a series compensating field winding 12b connected in series circuit relation therewith, and main and regulating field windings 12c and 12d, respectively. The main field winding 12c may be supplied with sufficient excitation to limit the reel motor to a safe maximum speed being, for example, connected to the conductors 18 and 19. The regulating field winding 12d may be supplied with electrical energy from a counter E. M. F. regulating generator 35 having an armature 35a, a current field winding 35b, an anti-hunt field winding 35c, a self-energizing field winding 35d, a stall tension field winding 35e, a voltage field winding 35f and a pattern field winding 35g.

The self-energizing field winding 35d may be connected in series circuit relation with the armature 35a and the regulating field winding 12d of the reel motor. A rectifier device 37 may be connected in series circuit relation therewith so as to provide for cumulatively energizing the field winding 12d. A resistor 38 may be connected in series circuit relation with the armature 35a and the self-energizing field winding for normally limiting the excitation thereof to such a value as to substantially compensate for the air gap magnetomotive force losses of the regulating generator. An additional resistor 39 may be connected in series circuit relation with the armature and the self-energizing field winding for reducing the excitation of the self-energizing field winding in the minimum or stop position of the master rheostat 24. This may be effected by utilizing a limit switch 40 having a contact member 40a which normally shunts the resistor 39 and which is actuated to the open position when the master rheostat 24 is operated to the minimum or stop position.

In order to provide for controlling the excitation of the regulating field winding 12d of the reel motor to maintain a substantially constant value of counter E. M. F. for a given strip speed, the pattern field winding 35g may be connected to be energized in accordance with the output voltage of a pilot generator 42 connected in driving relation with the mill motor 16. The voltage field winding 35f may be connected across the armature 12a of the reel motor in opposed relation to the pattern field winding 35g. The current field winding 35b may be connected cumulatively with respect to the pattern field winding across the series compensating field winding 12b of the reel motor. The anti-hunt field winding 35c may be connected across the armature 35a of the regulating generator to stabilize the output voltage thereof. The stall tension field winding 35e may be connected to a suitable source of control voltage being, for example, connected by means of contact member 40b of the switch 40 to the conductors 18 and 19 so as to provide a fixed value of field excitation for the regulating field winding 12d when the mill is stopped.

The armature 12a of the reel motor 12 may be supplied with electrical energy from a reel motor generator 44 having an armature 44a and a field winding 44b. The armature 44a may be connected in closed circuit relation with the armature 12 of the reel motor. The field winding 44b may receive its base value of energization in accordance with the speed of the strip 14, being, for example, connected to the variable voltage conductors 19 and 25 through a section 24b of the master rheostat 24.

The excitation of the generator field winding 44b may be regulated from this base value by means of a tension regulating generator 46 having an armature 46a, a self-energizing field winding 46b, a bias field winding 46c, a tension field winding 46d, a stabilizing voltage field winding 46e, a neutralizing pilot field winding 46f, an anti-hunt field winding 46g and a forcing field winding 46h.

The armature 46a may be connected in shunt circuit relation with the generator field winding 44b and the source of variable reference voltage. The self-energizing field winding 46b may be connected in series circuit relation with the field winding 44b and the source of reference voltage, so as to provide for compensating for the air gap magnetomotive losses of the regulating generator when the net effect of the remaining control fields is zero and the armature current is also zero. The anti-hunt field winding 46g may be connected across the armature 46a in the usual manner.

In order to provide for varying the energization of the armature 12a of the reel motor in accordance with the tension of the strip 14, the tension field winding 46d may be connected across a bridge circuit 48 comprising fixed resistors 48a and 48b and variable resistors 48c and 48d arranged in a Wheatstone bridge circuit. The variable resistors 48c and 48d may be in the form of tapped resistors having a plurality of flexible contact members 48e connected thereto at spaced intervals, and which may be actuated by a tensiometer device 49 having an arm 50a depending from a bell crank lever 50 actuated by means of fluid pressure means 51 and having mounted thereon a roller 52 which engages the strip of material 14.

With the roller 52 in a predetermined operating position corresponding to the desired value of tension in the strip of material 14 the effective values of the resistors 48c and 48d may be, for example, substantially equal. Movement of the roller 52 downward progressively actuates more of the contact member 48e associated with the resistor 48c into engagement with each other, thereby reducing the effective value of the resistor 48c. Movement of the roller 52 upward likewise reduces the effective value of the resistor 48d. These movements produce circulating currents through the tension field winding 46d in opposite senses, thus controlling the output voltage of the tension regulating generator 46 in accordance with the tension of the strip 14, so as to restore the desired value of strip tension.

In order to provide for stabilizing the operation of the regulating generator 46, the stabilizing voltage field winding 46e may be connected in a differential sense across the armature 12a of the reel motor. The pilot field winding 46f may be connected in a cumulative sense to the pilot generator 42 so as to substantially neutralize the magnetomotive force of the voltage field winding under steady state conditions. During transient conditions the voltage across the armature 12a will vary with respect to the voltage of the pilot generator 42, in opposite senses, depending on whether the tension field winding 46d is functioning to effect an increase or a decrease in the excitation of the field winding 44b of the reel motor generator. The voltage field winding 46e may thus be used in a differential sense to stabilize operation of the regulating generator in either direction.

In order to provide for limiting the speed of the reel motor in the event that the strip 14 should break, a limit switch 54 may be connected in operating relation with the bell crank 50 of the tensiometer device 49, the limit switch having a contact member 54b disposed to open in the minimum tension position to insert a rheostat 55 in series circuit relation with the tension field winding 46d. At the same time a contact member 54a of the limit switch 54 may be disposed to interrupt the energizing circuit of the bias field winding 46c so as to reduce the net value of the pattern field on the tension regulating generator.

In normal operation, the counter E. M. F. regulating generator 35 matches the voltage of the pilot generator 42 against the net effects of the current and voltage field windings 35b and 35f so as to vary the energization of the regulating field winding 12d of the reel motor to maintain a predetermined relationship between the counter E. M. F. of the reel motor and the speed of the strip 14, thus compensating for the change in reel diameter as the strip 14 is wound thereto. The principal energization of the armature of the reel motor 12 is controlled by means of the tensiometer device 49 which is actuated by the strip 14 to vary the excitation of the tension field winding 46d in opposite senses depending on whether the tension of the strip increases or decreases from the desired value.

Variations in excitation of tension field winding 46d reversibly control the output voltage of the tension regulating generator 46, so as to vary the output voltage of the reel motor generator 44 and hence, the armature current of the reel motor 12, so as to restore the tension of the strip to the desired value. The ampere turns of the tension field winding 46d will be substantially proportional to the error in the position of the tensiometer roll 52 and are in a direction such as to correct that error.

Under steady conditions, the differential ampere turns of the voltage field windings 46e will be substantially neutralized by the cumulative ampere turns of the pilot field winding 46f. During a change in the output voltage of the tension regulating generator, however, the differential will exist between these two. For example, when the tension regulating generator 46 is operating to increase the voltage applied to the field winding 44b of the reel motor generator the voltage field winding 46e will have more ampere turns than the pilot field winding and hence the voltage field winding affords a differential stabilizing influence which tends to prevent over-shooting of the regulating generator. The same condition holds when the regulating generator is operating to reduce the excitation of the field winding 44b.

During a speed change of the mill, the forcing field winding 46h will be energized in accordance with the voltage applied to the rheostat motor 28, which will be proportional to the rate of change of speed of the mill, so that its ampere turns will be proportional to the rate of change of mill speed. This winding operates to modify the output voltage of the tension regulating generator 46, so as to anticipate a change in tension of the strip 14 due to the changing of mill speed, thus permitting the value of tension to be maintained, without requiring an error therein to effect operation of the tensiometer device.

When the mill is running at threading speed and before the reel is threaded, the tensiometer roll 52 will be in the extreme low tension position, and the limit switch 54 will be open. A constant voltage from the bridge circuit 48 will be impressed on the tension field winding 46d through the threading speed rheostat 55. The ampere turns of the tension field winding are accumulative with respect to the ampere turns of the pilot field winding. Thus the threading speed of the reel may be adjusted by means of the threading speed rheostat to a value which is slightly higher than the strip speed.

Should it be desirable to begin raising the speed of the mill before the reel is threaded, the energization of the pilot field winding 35g will be increased, so that the threading speed of the reel will remain in the desired relation to the mill speed, thus insuring a tight wrap of the strip on the reel. As soon as the strip is wrapped on the reel the tensiometer roll 52 is actuated by the strip 14, and the limit switch 54 closes, shorting out the threading speed rheostat 55, to obtain normal energization of the tension field winding 46d, and connecting the bias field winding 46c to the conductors 18 and 19 so as to place the regulating generator 46 in full control of the reel motor generator voltage.

When the mill is stopped the limit switch 40 operates to insert the control resistor 39 in circuit relation with the armature 35a of the counter E. M. F. regulating generator 35, so as to "detune" the regulating generator, and to connect the stalled field winding 35c to provide a predetermined output voltage for the regulating generator for maintaining stalled tension.

From the above description and the accompanying drawing it will be apparent that I have provided in a simple and effective manner for controlling the operation of a reel motor by means of a tensiometer device. By utilizing a regulating generator responsive to the operating position of the tensiometer device for controlling the armature current of the reel motor, accurate control of the strip tension may be maintained. By utilizing opposed voltage and pilot field windings on the regulating generator the operation thereof may be stabilized so as to effectively prevent hunting.

Since certain changes may be made in the above-described construction, and different embodiments of the invention may be made without departing from the spirit and scope thereof, it is intended that all the matter contained in the above description and shown in the accompanying drawings be taken as illustrative and not in a limiting sense.

I claim as my invention:

1. A control system for a motor connected in driving relation with a device for handling a strip of material proceeding from a work device comprising, excitation means for the motor responsive to the speed of the work device, generating means disposed to supply electrical energy to the motor, excitation means connected to control the output of the generating means in accordance with the speed of the work device, a regulating generator connected to vary energization of the excitation means of the generating means, said regulating generator having excitation means, and circuit means including a tensiometer device actuated by the strip connected to reversibly energize said regulating generator excitation means.

2. In a control system for a motor connected in driving relation with a device for handling a strip of material, said motor having field and armature windings, regulating means effective to energize the field winding in accordance with the speed of the material, generating means connected to supply electrical energy to the armature winding, circuit means providing a base excitation for the generating means in accordance with the speed of the material, and additional regulating means connected to vary the excitation from said base value in accordance with the tension of the strip of material.

3. In a control system or a dynamoelectric machine connected in driving relation with a device operable to handle a strip of material, said machine having an armature and a field winding, a regulating generator connected to effect energization of the field winding to maintain a predetermined relation between the counter E. M. F. of the motor and the speed of the strip, generating means connected in electrical energy transferring relation with the armature of the motor, an additional regulating generator connected to supply field excitation to the generating means, excitation means for the additional regulating generator differentially responsive to the speed of the strip and the armature voltage of the dynamoelectric machine, additional excitation means for the additional regulating generator, and circuit means including a tensiometer device actuated by the strip connected to reversibly energize said additional excitation means.

4. In a control system for a motor connected in driving relation with a device for handling a strip of material proceeding from a work device, said motor having an armature and a field winding, regulating means connected to effect excitation of the field winding to maintain a predetermined relation between the speed of the work device and the counter E. M. F. of the motor, generating means connected to effect energization of the motor armature, said generating means having an excitation field winding disposed to be connected to a source of variable reference voltage which determines generally the speed of the work device, an additional regulating generator connected to supply electrical energy to the excitation field winding of the generating means, said additional regulating generator having a tension control field winding and a self-energizing type of field winding connected in circuit relation with the field winding of the generating means and the source of reference voltage, and control means including a tensiometer device actuated by the strip connected to reversibly energize the tension control field winding.

5. In a control system for a motor, said motor having an armature and a field winding, regulating means effective to control the excitation of the field winding to maintain a predetermined relation between the motor counter E. M. F. and the speed of a strip of material which is controlled by the motor, generating means connected to supply electrical energy to the armature, a regulating generator connected to control the output voltage of the generating means, said regulating generator having opposed field excitation means responsive to the speed of the strip and to the armature voltage of the motor, and additional field excitation means connected to be reversibly energized in accordance with variations in the tension of the strip above and below a predetermined value.

6. In a control system for a motor having an armature and a field winding and connected to handle a strip of material, a regulating generator connected to energize the field winding to maintain a predetermined relation between the counter E. M. F. of the motor and the speed of the strip, generating means connected to supply electrical energy to the motor armature, an additional regulating generator connected to regulate field excitation of the generating means, said additional regulating generator having a plurality of field windings including cumulative and differential field windings energized respectively in accordance with the speed of the strip and the voltage of the reel motor armature, circuit means including a variable impedance bridge circuit responsive to strip tension connected to reversibly energize another of said plurality of field windings, and additional circuit means including switch means open when the strip tension reaches a predetermined minimum value connecting another of the plurality of field windings cumulatively with respect to the first of said plurality of field windings.

7. The combination with a motor having an armature and a plurality of field windings and connected in driving relation with a device to handle a strip of material proceeding from a work device whose speed is controlled by a master rheostat which varies a reference voltage, circuit means connecting one of said field windings to a source of substantially constant control voltage, a regulating generator differentially responsive to the speed of the work device and the counter E. M. F. of the reel motor, circuit means including a rectifier device connecting the regulating generator to effect excitation of another of said field windings cumulatively with respect to said one of said field winding, a generator having an armature connected in circuit relation with the motor armature and having a field winding, circuit means connected to energize the generator field winding in accordance with the reference voltage, an additional regulating generator connected in shunt circuit relation with the generator field winding, said additional regulating generator having a plurality of field windings, circuit means including a tensiometer device responsive to tension of the strip connected to reversibly energize one of said plurality of additional regulating generator field windings in accordance with variations in strip tension above and below a predetermined value, circuit means connecting another of said plurality of windings differentially in accordance with the armature voltage of the motor, and additional circuit means connecting yet another of said plurality of field windings in accordance with the speed of the work device in opposed relation to the aforesaid differential voltage winding.

8. In combination with a motor, a generator connected to supply electrical energy to the motor, said generator having a field winding connected to a source of excitation, and a regulating generator connected in shunt relation with the generator field winding and excitation source to vary the excitation of the field winding, said regulating generator having a self-energizing field winding connected in series circuit relation between the generator field winding and the source of excitation.

9. The combination with a motor having an armature and a pair of field windings, said motor being connected in driving relation for handling a strip of material, of a pilot generator connected to produce a voltage proportional to the speed of the strip, circuit means connecting one of said field windings to a substantially constant voltage source, a regulating generator having a plurality of field windings including a pattern field winding connected to the pilot generator and cumulative and differential field windings energized in accordance with the armature voltage and current of the reel motor, respectively, circuit means including a rectifier device connecting the regulating generator to effect cumulative energization of another of the motor field windings, generating means connected to supply electrical energy to the motor armature having field excitation means connected to a source of reference voltage, an additional regulating generator connected in shunt circuit relation with said field excitation means and said source, said additional regulating generator having a plurality of field windings including a tension field winding disposed to be connected for reversible energization in a bridge circuit variable in resistance with the tension of the strip of material, circuit means connecting another of said additional regulating generator field windings to the pilot generator, and additional circuit means connecting yet another of said additional regulating generator field windings across the motor armature in opposed relation to said another of said additional regulating generator field windings.

10. In a control system for a motor connected for handling a strip of material, a regulating generator connected to control the supply of electrical energy to the motor, said regulating generator having a plurality of field windings, circuit means connecting one of said field windings to a substantially constant voltage source, a tensiometer device actuable to different operating positions in accordance with the tension of the strip of material, circuit means connecting another of said field windings in a bridge circuit including variable impedance means operated by the tensiometer device, a resistor connected in circuit relation with said another of said field windings, and switch means operable in response to movement of the tensiometer device to a minimum tension position to provide a shunt circuit about said resistor and disconnect said one field winding from said source.

WILLIAM T. HUNT, JR.

REFERENCES CITED

The following references are of record in the file of this patent:

UNITED STATES PATENTS

| Number | Name | Date |
| --- | --- | --- |
| 2,281,083 | Stoltz | Apr. 28, 1942 |
| 2,297,812 | Stoltz | Oct. 6, 1942 |
| 2,363,684 | Montgomery | Nov. 28, 1944 |
| 2,437,973 | Schmitz | Mar. 16, 1948 |
| 2,444,248 | Crever | June 29, 1948 |
| 2,454,232 | Stoltz | Nov. 16, 1948 |